Jan. 3, 1928.

H. TAUSCHER 1,654,763

SHOCK ABSORBER

Filed Dec. 10, 1925

Inventor
HENRY TAUSCHER

By Munn & Co.
Attorney

Jan. 3, 1928.
H. TAUSCHER
SHOCK ABSORBER
Filed Dec. 10, 1925
1,654,763
2 Sheets-Sheet 2
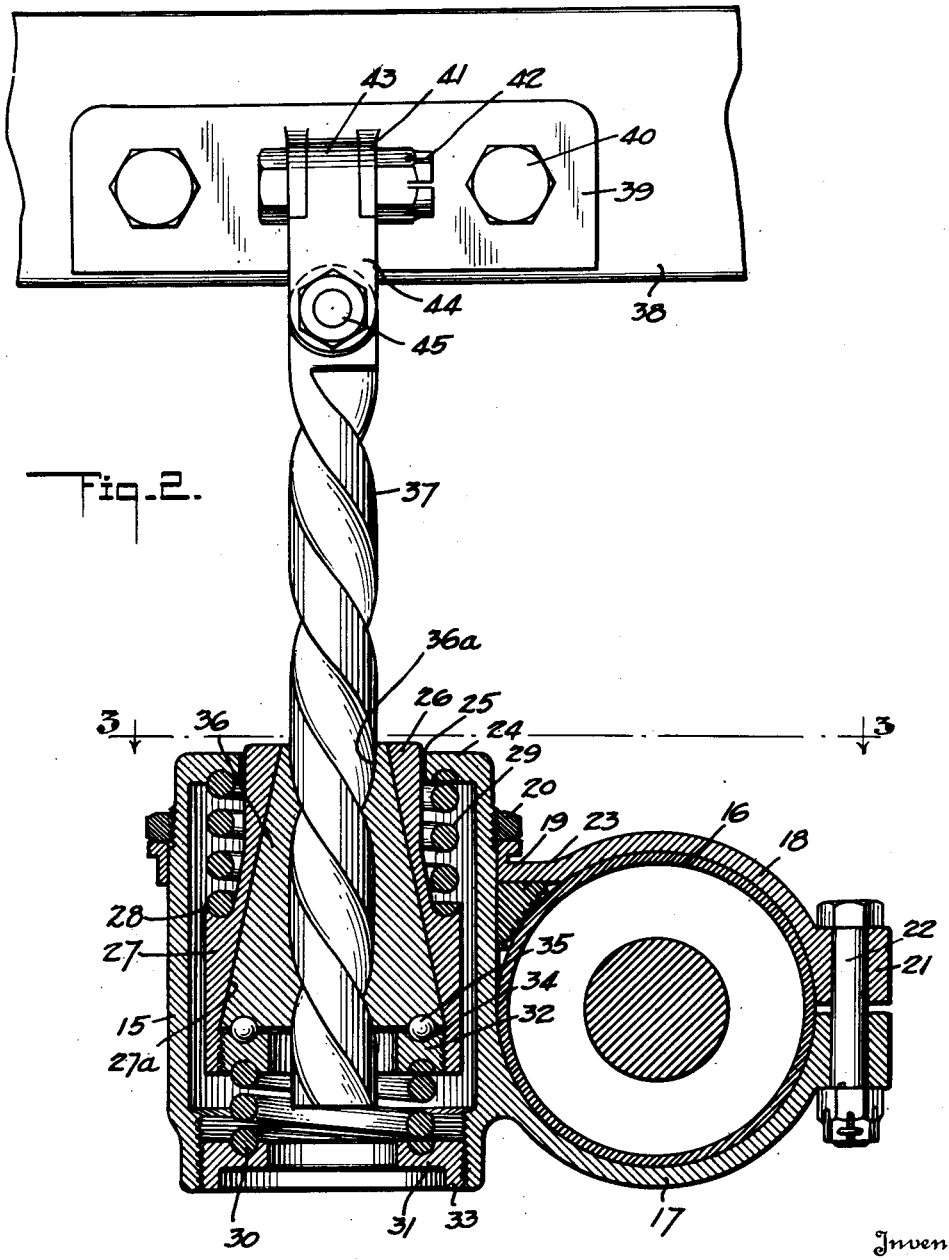
Inventor
HENRY TAUSCHER
By Munn & Co.
Attorney Patented Jan. 3, 1928.

1,654,763

UNITED STATES PATENT OFFICE.

HENRY TAUSCHER, OF LOMPOC, CALIFORNIA.

SHOCK ABSORBER.

Application filed December 10, 1925. Serial No. 74,596.

My invention relates to recoil mechanisms for checking the rebound of bodies, and particularly, although not necessarily, to shock absorbers for motor vehicles. It is a purpose of my invention to provide a shock absorber which is operable automatically to permit unrestricted flexing of the springs of the vehicle but to retard the reflexing thereof to the extent of allowing the gradual return of the vehicle body to normal elevation without shock or jar.

It is also a purpose of my invention to provide a shock absorber the structural simplicity and durability of which is such as to successfully withstand without appreciable wear the severe strains and stresses to which it is subjected when in use, and to automatically adjust itself to suit various conditions so as to render it applicable to motor vehicles of different sizes and types.

I will describe only one form of shock absorber embodying my invention and will then point out the novel features thereof in claims.

In the accompanying drawings,

Figure 2 is an enlarged vertical sectional view of the shock absorber shown in Figure 1 and in applied position to the vehicle;

Figure 1:
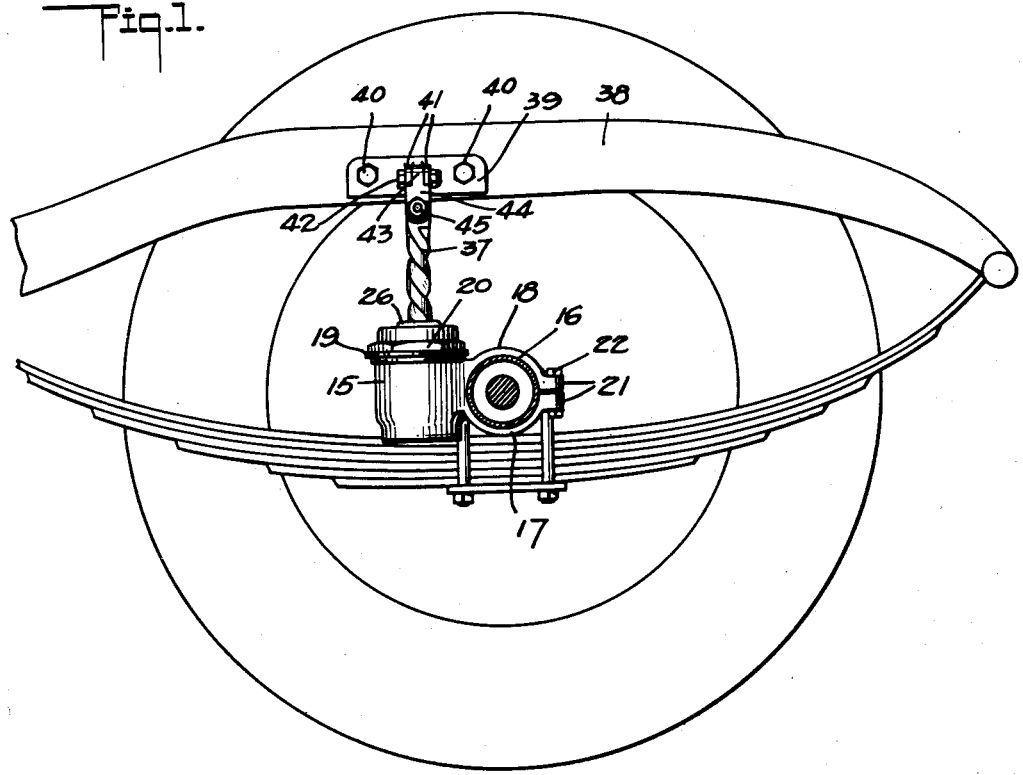
Figure 1 is a view showing in side elevation one form of shock absorber embodying my invention in applied position to the rear axle of a motor vehicle.
Figure 3:
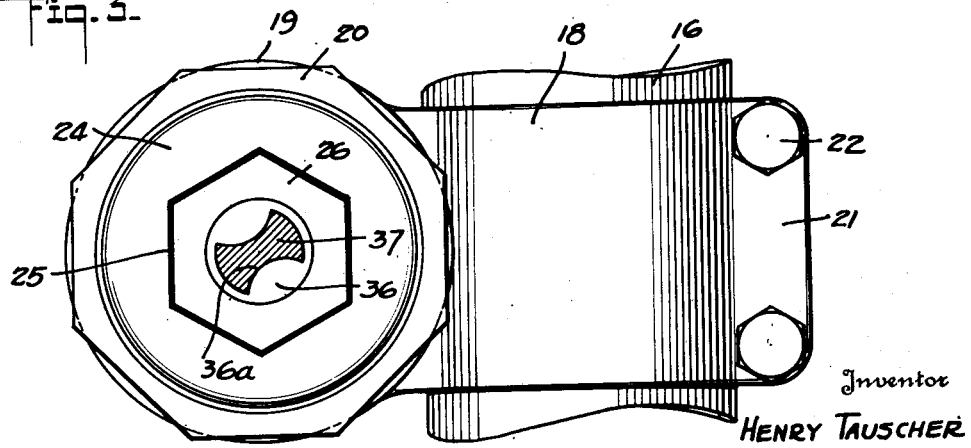
Figure 3 is a horizontal sectional view taken on the line 3—3 of Figure 2.

Referring specifically to the drawings, in which similar reference characters refer to similar parts in each of the views, my invention, in its present embodiment, comprises a tubular casing 15 rigidly secured to the rear axle housing 16 of a motor vehicle by means of a two-part bracket embracing the housing with one part 17 formed integral with the casing 15 and the other part 18 provided with a collar 19 embracing the casing 15 and forming an abutment for a clamping ring 20 threaded on the casing, as clearly shown in Figure 2. The parts 17 and 18 of the bracket are provided with ears 21 through which a bolt 22 extends for securing the parts in clamping relation to the axle housing, and a serrated block 23 is interposed between the casing and the housing, as shown in Figure 2, to have biting engagement with the housing and to thus prevent circumferential slipping of the bracket.

The casing 15 is provided at its upper end with an in-turned flange 24 shaped to provide a hexagonal opening 25 in which is loosely fitted the upper hexagonal end 26 of a socket member 27, the latter being disposed within the casing 15 and provided with a cupped annular shoulder 28 in which seats the lower end of an expansible spring 29. This spring 29 is relatively strong and is interposed between the shoulder 28 and the flange 24 so as to operate to urge the socket member downwardly within the casing. A second spring 30 is associated with the lower end of the socket member to urge the latter upwardly, but this spring is weaker than the spring 29, so that the socket member responds to the urging action of the latter spring. As clearly shown in Figure 2, the spring 30 is interposed between a flange 31 and a bearing ring 32, the flange constituting an integral part of a screw plug 33 threaded in the lower end of the casing 15 and cupped at its upper side to provide a seat for the spring. The bearing ring 32 is threaded in the lower end of the socket member 27 and, hence, is adjustable vertically therein with its lower side cupped, as shown, to receive the upper end of the spring 30. The upper side of the bearing ring 32 is provided with a raceway 34 in which ball bearings 35 are seated, the remainder of the raceway for the balls being formed by grooving the lower end of a head member 36.

The head member 36, as shown in Figure 2, is of frusto-conical form, and to rotatively receive this head member the socket member 27 is provided with a frusto-conical socket, indicated at 27ª, the bearing ring 32 confining the head member within the socket and the balls 35 providing a rotatable support for the head member. The member 36 is formed with a spiral bore 36ª co-extensive in length with the member and receiving therein a spiral shaft or shank 37 in such manner that the spirals of the bore and shaft have operative engagement to cause rotation of the socket member 36 when the shaft is moved longitudinally in either direction. The upper end of this shaft 37 is provided with a universal connection by which it is adapted to be connected to the frame 38 of the motor vehicle, and this universal connection in the present instance comprises a bracket 39 secured to the frame 38 by bolts 40, and a pair of spaced ears 41 through which a bolt 42 is extended for pivotally connecting an ear 43 to and between the ears 41, with the latter forming a part of a connecter 44 which, in turn, is pivotally connected to the upper end of the shaft 37 by means of a bolt 45. By this connection, two pivots 42 and 45 are provided which are disposed at right angles to each other, whereby the shaft 37, although connected to the frame 38, is capable of lateral movement in two planes.

In practice, the parts of the shock absorber normally occupy the position shown in Figure 2 or when the connector housing and frame are spaced apart their normal distance. Upon downward movement of the frame 38, the shaft 37 moves downwardly within the socket member 36, and because of the operative engagement of the shaft with the bore of the socket member a rotative force is exerted on the latter. This rotative force not only acts circumferentially but downwardly, so that the outer wall of the conical head member is out of contact with the wall of the socket 27ª, wherefore it will be seen that the head member is free to respond to the rotative action of the shaft 37, thereby permitting a downward feeding of the shaft through the member to permit lowering of the vehicle frame 38. This downward movement of the shaft 37 is unrestricted so as to permit the proper flexing of the springs of the vehicle when encountering an undulation in the roadway. However, upon upward movement of the frame 38 under the reflex action of the vehicle springs, an upward pull is exerted on the shaft 37. This upward movement of the shaft 37 is controlled by the shock absorber in a manner to retard and thus allow the gradual elevation of the frame 38 to normal position, whereby the shocks and jars to which the vehicle body is usually subjected are eliminated. On initiating the upward pull of the shaft 37, the conical head member 36 is slightly elevated to bring its wall into engagement with the wall of the socket 27ª, whereby the head member is resisted in its rotational movement. Thus it will be clear that the shaft 37 is checked in its upward movement, but such checking is graduated to the desired degree by the upward yielding of the socket member 27, due to a compression of the spring 29. This yielding movement prevents the exertion of any undue strains or stresses upon the parts of the shock absorber, yet permits the proper checking of the upward movement of the shaft 37. Immediately following this yielding movement, the rotative force exerted by the shaft 37 in its upward pull operates to rotate the head member 36 within the socket, but the rotational movement of the latter is retarded by virtue of the resistance set up between its wall and that of the socket, so as to operate to permit a gradual upward movement of the shaft 37 and to thus allow the gradual return of the vehicle frame to the normal elevated position.

An important feature of my invention is the resilient mounting of the socket member 27 to allow the latter to respond vertically in either direction to any sudden movement of the shaft 37 whereby the strains and stresses to which the parts of the absorber are subjected are minimized. As previously described, the upper end 26 of the socket member 27 is loosely fitted within the opening 25 for the purpose of allowing a limited lateral movement of the socket member to respond to any lateral displacement of the shaft 37 and to thereby prevent any binding of the shaft and head member and to thus insure the proper operation of these elements at all times. Lateral movement of the shaft 37 is reduced to a minimum by virtue of the universal connection between such shaft and the frame 38, as it will be clear that the two pivots 42 and 45 of the connection will allow the vehicle frame to occupy various positions without disturbing the vertical position of the shaft 37.

Although I have herein shown and described only one form of shock absorber embodying my invention, it is to be understood that various changes and modifications may be made therein without departing from the spirit of the invention and the spirit and scope of the appended claims.

I claim as my invention:

1. A shock absorber comprising a member, a conical rotatable member movable in the first member and having a spiral bore, a third member of spiral form movable through the rotatable member in a manner to rotate the latter, and a floating conical member by which the rotatable member is retarded in its rotation in one direction whereby the lengthwise movement of the third member in one direction is retarded.

2. A shock absorber comprising a member locked against rotation and having a conical socket, a second member of conical form supported for rotation in the socket and having a spiral bore, and a third member of spiral form movable through the rotatable member whereby the friction between the second and third members will operate to move the second member lengthwise in such direction as to allow free rotation of said member in the socket when the third member is moved longitudinally in one direction, and to move the second member lengthwise in the other direction and thus into frictional engagement with the wall of said socket when the third member is moved lengthwise in the other direction, thereby retarding movement of the latter in such direction.

3. A shock absorber as embodied in claim 2 wherein the first member is mounted to yield lengthwise, thereby effecting a gradual retardation in the lengthwise movement of the third member in the last mentioned direction.

4. A shock absorber as embodied in claim 2 wherein a mounting is adapted to be attached to a vehicle axle for supporting the first member for yielding lengthwise movement, and a universal connection is adapted to be attached to the frame of the vehicle for operatively connecting the third member to the vehicle frame.

5. A shock absorber as embodied in claim 2 wherein the first member is mounted to yield lengthwise and transversely for the purpose described.

6. A shock absorber comprising a casing having internal end flanges, one of which is adjustable to vary the space between the flanges, one of said flanges providing an angular opening, an exteriorly shouldered socket member in the casing having an angular portion engaging within said opening to lock the member against rotation and having a conical socket, a conical head member in the socket member and having a spiral bore, a spiral member extending through the spiral bore and having a meshing engagement therewith, an adjustable non-friction bearing member in the socket member for rotatably confining the head member therein, a relatively strong spring between the shoulder of the socket member and one of said flanges, and a weaker spring between the bearing member and the other of said flanges.

HENRY TAUSCHER.